W. A. ROGERS & E. STANLEY.
CLOSURE.
APPLICATION FILED JULY 6, 1914.
1,176,989.
Patented Mar. 28, 1916.
2 SHEETS—SHEET 1.
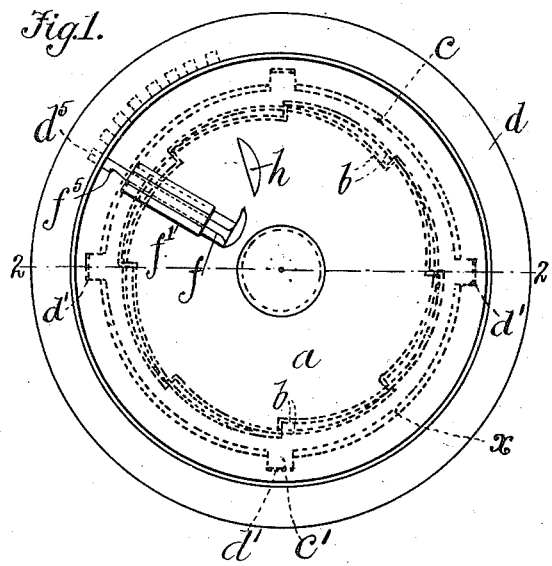
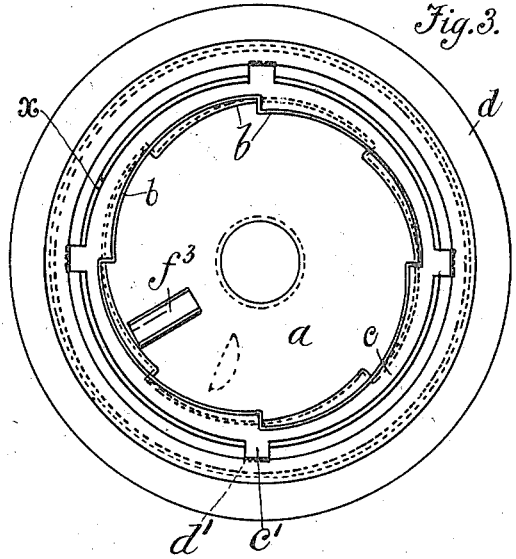
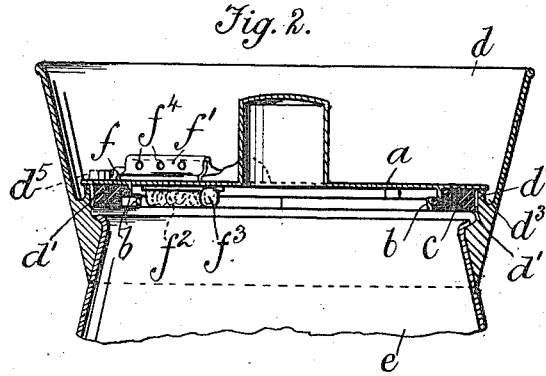
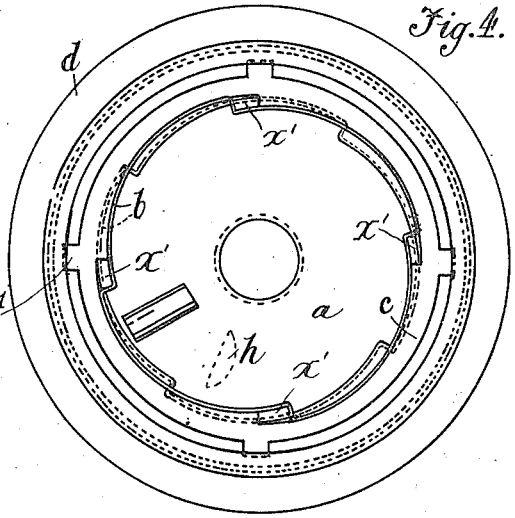
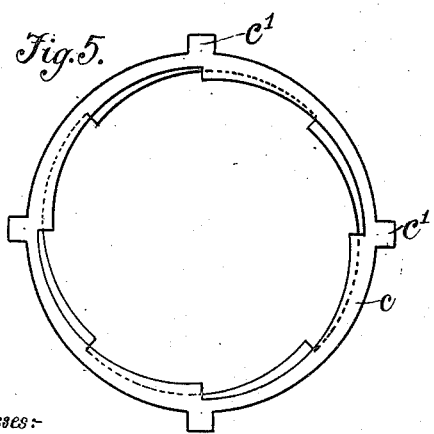
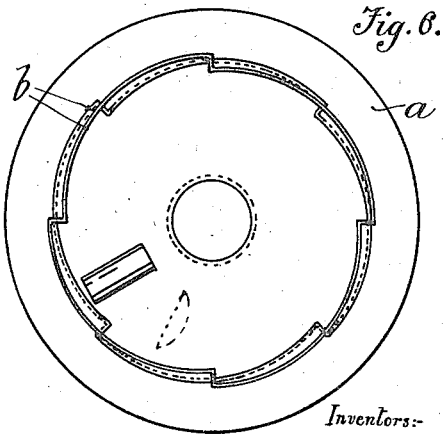
Witnesses:—
Inventors:—
William Alfred Rogers.
Edgar Stanley.

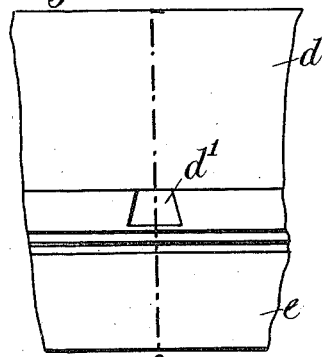
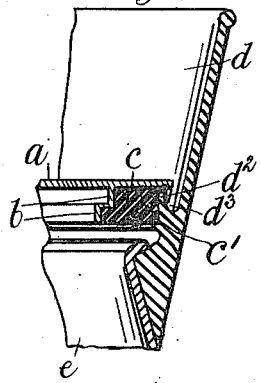
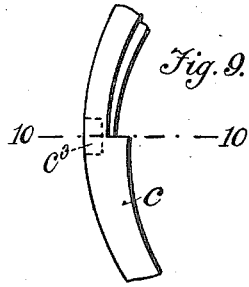
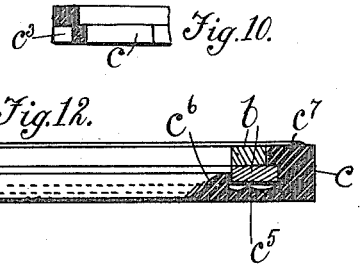
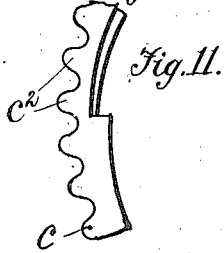
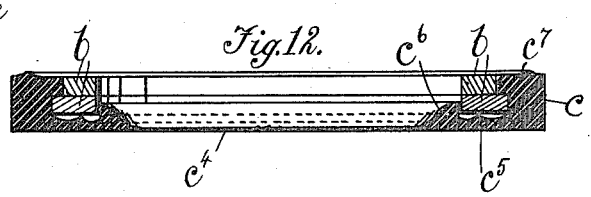
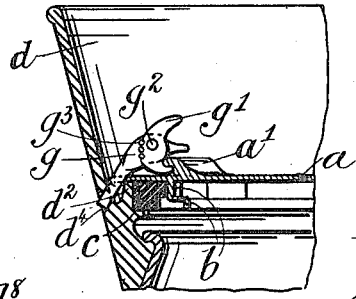
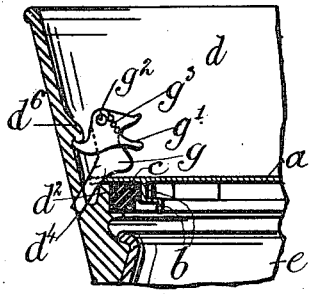
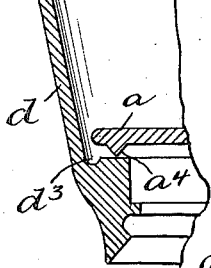
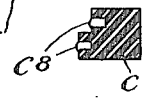
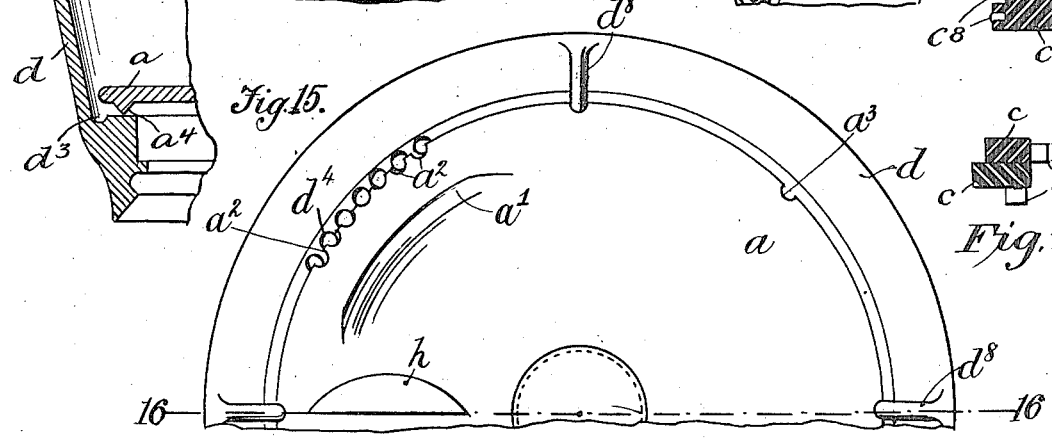

UNITED STATES PATENT OFFICE.

WILLIAM ALFRED ROGERS AND EDGAR STANLEY, OF LONDON, ENGLAND.

CLOSURE.

1,176,989.  Specification of Letters Patent.  Patented Mar. 28, 1916.

Application filed July 6, 1914. Serial No. 849,229.

*To all whom it may concern:*

Be it known that we, WILLIAM ALFRED ROGERS and EDGAR STANLEY, subjects of George V, King of Great Britain and Ireland, and residing at 41 Bangalore street, Putney, London, England, and 5 Luscombe street, Wandsworth Road, London, S. W., England, respectively, have invented certain new and useful Improvements in Closures, of which the following is a specification.

This invention relates to closures, and although it is more particularly intended for application to the closures of milk churns (and will hereinafter be described chiefly in connection therewith) it is nevertheless applicable to closures of general utility, such as liquid containers for transit through pneumatic tubes, medical receptacles and for food.

The importance of preventing the ingress of foreign matter into milk churns is now well recognized. Heretofore, however, the joint between the closure and the body of the churn has been defective with the result that the milk has often been found to be contaminated. Further, with previously constructed milk-churns it has often been possible to remove the closure and tamper with the contents without leaving any outward evidence that this has been done.

Now, the chief objects of this invention are to make a more efficient seal between the closure and the churn-body or the like, and to enable any tampering with or movement of the closure to be detected.

The first-named object is attained, according to this invention, by providing a flexible packing for the joint and providing the closure or the body of the milk-churn or the like—but preferably the closure—with means which move the packing laterally and circumferentially when there is relative rotary movement between the closure and the said body, thereby producing an air-, dust-, water- or other gas- or liquid-tight joint. The second-named object is attained, according to this invention, by providing a device which not only acts as a lock for the closure but also as a seal, so that if the lock is tampered with the seal becomes automatically broken or distorted.

The accompanying drawings illustrate, by way of example, the application of this invention to a milk churn.

Figure 1 is a plan of the closure, showing in broken lines the flexible ring (non-expanded) and means for expanding it. Fig. 2 is a section on line 2—2 of Fig. 1. Fig. 3 is a bottom plan of Fig. 1. Fig. 4 is a similar view to Fig. 3 showing, however, the ring expanded. Fig. 5 is a bottom plan of the ring by itself. Fig. 6 is a bottom plan of the closure by itself. Fig. 7 is an elevation of the neck of a milk-churn as seen from within, and shows one of a series of recesses adapted to receive corresponding projections on the ring for the purpose of preventing rotation of the latter, and Fig. 8 is a section on line 8—8 of Fig. 7 showing in addition a portion of the closure in section. Fig. 9 is a plan of a portion of the ring showing in broken lines a modified form of recess adapted to receive projections on the neck of the churn, so as to prevent rotation of the ring therein, and Fig. 10 is a section on line 10—10 of Fig. 9. Fig. 11 is a plan of a portion of a modified form of ring having a corrugated edge adapted to fit into corresponding corrugations in the neck of the churn, so as to prevent rotation of the ring therein. Fig. 12 is a section of a further modified form of ring having a diaphragm extending completely across from side to side thereof. Figs. 13 and 14 are sections of a portion of the neck and closure of a churn and respectively show two forms of locking and seal-shearing device. Fig. 15 is a part plan of a churn the upper portion of which is adapted to accommodate the locking and seal-shearing device shown in Fig. 14 and shows in addition vertical ribs on the neck for the purpose of guiding the closure into its place. Fig. 16 is a section on line 16—16 of Fig. 15. Figs. 17 and 18 show in section further modified forms of flexible ring. Fig. 19 shows in section a portion of the neck of a churn and a modified form of closure for reducing friction when the latter is rotated.

Like letters of reference indicate like parts throughout the drawings.

Referring to the drawings, *a* represents the closure, *b* the segments (arrangd step fashion) thereon, *c* the ring, which may be made of rubber, *d* the neck into which the closure fits and *e* the body of the churn. The segments are arranged on the under surface of the closure, and there are two layers or tiers of them. As shown in the drawings, the segments are arranged symmetrically around the center of the closure, the radius of curvature being that best suited to cause the ring to make a tight joint when the closure has been given, say, a sixth of a revolution. When the extreme points of the segments of the superposed layers or tiers of segments are arranged so as to alternate or otherwise relatively to one another, the outer periphery of the closure presents the appearance of a series of steps. The segments may be formed of strip material as illustrated in Sheet 1 of the drawings, or in the edge of a pair of superposed solid rings, as shown in Fig. 12, or otherwise.

The inner periphery of the ring $c$ is formed to fit the segments and suitable means are provided for preventing its rotation; for example, its outer periphery may be provided with lugs $c'$ fitting into recesses $d'$ in the neck $d$, Figs. 1–4, or with corrugations $c^2$ (Fig. 11) fitting into corrugations in the neck, or with recesses $c^3$ (Figs. 9 and 10) into which are fitted lugs or claws provided on the neck $d$. The recesses $c^3$, instead of being formed in the edge of the ring, as shown in Figs. 9 and 10, may be formed near the middle of the ring so as to leave some material on the outer side of the recesses. In its non-expanded form the inner periphery of the ring $c$ is in close contact at every point with the segments $b$ and there is also a space $x$ between its outer periphery and the neck $d$ as shown in Figs. 1 and 3, but during the rotation of the closure the segments $b$ slide along the segments on the inner periphery of the ring, thereby forcing the ring outward and closing the space $x$ and also leaving a space $x'$ between contiguous ends of the segments on the closure and the segments in the ring as clearly shown in Fig. 4. Thus the ring becomes tightly wedged or jammed between the segments of the closure on its inner side and the inside of the neck on its outer side, thereby insuring a tight joint. In order to completely cut off the closure from the interior of the body of the churn, the ring may be provided with a diaphragm $c^4$, as shown in Fig. 12, extending from side to side thereof, and in order to secure a delicate and effective joint between the ring and the lower segments $b$ the diaphragm is provided with a ridge $c^5$ and lip $c^6$, and in order also to secure a similar joint between the ring and the under surface of the closure a ridge $c^7$ is formed on the upper surface of the ring. By making the recess $d'$ (Fig. 7) dovetailed the lug $c'$ tends to spread more at the base than it does higher up and so draws the closure tightly down on to the upstanding rim $d^2$ which extends completely around the flue of the churn and is made thin so as to reduce friction and secure a more perfect joint between itself and the closure. Between the upstanding rim $d^2$ and the neck $d$ is formed a gutter $d^3$ provided with drain holes $d^4$ (Figs. 13, 14 and 15) for draining off any water, etc., that may collect in the neck of the churn.

It will be seen that by arranging the segments to alternate with one another a uniform expansion of the ring is secured.

Referring now to the locking and seal-shearing device shown in Figs. 1 to 4, $f$ is a bolt, substantially of inverted T-section, housed within a casing $f'$ and normally urged toward the center of the closure by means of a spring $f^2$ arranged within a casing $f^3$. The outer end of the bolt is arranged to take into one of a series of holes $d^5$ formed in the neck $d$. The housing $f'$ is provided with perforations $f^4$ and the bolt is correspondingly perforated, so that a lead or other seal can be passed through the bolt.

In Figs. 13 and 14 the lock and seal-shearing device consists of a pair of plates $g$, $g'$ pivoted together at $g^2$. The lower end of the plate $g$ is formed as a pin and fits into one of the drain holes $d^4$ and also one of the semi-circular depressions $a^2$ formed in the edge of the closure $a$. Further, one end of the plate $g'$ fits either under a lip $d^6$ formed on the neck $d$, as in Fig. 13, or under a lip $a'$ formed on the closure $a$, as in Fig. 14. The plate $g$ has a series of perforations $g^3$ and the plate $g'$ has a series of semi-circular depressions in one edge to register with the same, the object of the perforations being to receive the lead seal. The pivot $g^2$ is provided with a coil spring which acts to normally force the lower end of the plate $g$ and the outer nose of the plate $g'$ apart. Thus, with any of the forms of locking and seal-shearing device described, when the closure has been rotated so as to expand the ring and make the joint, the bolt $f$ (Figs. 1 and 2) is pushed forward into one of the recesses $d^5$, or, in the case of the arrangement shown in Figs. 13 and 14, the lower pin-end of the plate $g$ is inserted into the drain-hole $d^4$ which registers with one of the semi-circular depressions $a^2$ (see also Fig. 15) in the edge of the closure $a$. The upturned end of the plate $g'$ is then inserted under the lip $d^6$ or $a'$, as the case may be. The lock being in operative position the lead or other seal is then inserted in its place. The closure cannot then be lifted without producing relative movement between the parts of the lock. Any such movement causes the lead seal to be sheared off or distorted. When the ring has been fully expanded, the tendency is for the same to rotate the closure backward, and this action insures tight contact between the nose of the bolt $f$ or pin-end of the plate $g$, as the case may be, and the recess or hole into which it is inserted. The nose of the bolt $f$ has a notch $f^5$ so as to insure a still firmer locking of the same to its recess.

$h$, Figs. 1, 3, 4 and 15, is a raised plate for facilitating rotation of the closure by placing the finger-tips under it.

The perforations in the bolt $f$, or the plate $g$, as the case may be, are preferably countersunk so as to produce at one side a sharp edge which readily shears the seal when the lock is moved.

The seals may be made in different forms so that they can be identified with different owners.

By means of the ribs $d^8$ and semicircular depressions $a^3$ (Figs. 15 and 16) arranged to register therewith, the closure is enabled to readily gravitate into the best position for rotating and locking it, and when the closure has been partially rotated, the lower ends of said ribs also serve to prevent its being lifted off.

The ring is preferably made of rubber so as to enable it to accommodate itself to any irregularities there may be in the surfaces with which it comes in contact, but it may be made of soft metal. Each tier of segments may, if desired, be formed in a separate ring as shown in Fig. 17, each ring being provided with lugs $c'$ adapted to fit into recesses in the neck of the churn for preventing its rotation. The ring, when made of rubber or the like, may be shod or reinforced or stiffened with metal or other strips, as shown at $c^8$, Fig. 18, to facilitate movement of the same on the segments of the closure. In some cases, one tier, or more than two tiers of segments may be provided. Instead of the upstanding rim $d^2$, a plain shoulder may be formed in the neck at this point, as shown in Fig. 19, and the closure may be provided with a downwardly projecting thin rim or ring $a^4$ to reduce friction with the shoulder when the closure is rotated.

Although we have herein referred to "segments" on the closure we would have it understood that it is within the scope of this invention to employ corresponding parts having arcuate or other suitably curved surfaces, and shape the ring to fit the same.

We claim:—

1. In a container provided with a closure, segments integral with the closure, a flexible ring encircling said segments and arranged intermediate the container and the closure, the ring being such that when there is relative rotary motion between the ring and the closure the ring is moved radially and circumferentially, substantially as described.

2. In a container provided with a closure, segments in the container, a flexible ring arranged intermediate the container and the closure, the ring being such that when there is relative rotary motion between the ring and the container the ring is moved radially and circumferentially, substantially as described.

3. In a container provided with a closure, segments integral with the closure, a flexible ring intermediate the container and the closure and having a diaphragm such as $c^4$ and also fitting said segments, the ring being such that when there is relative rotary motion between the ring and the closure the ring is moved radially and circumferentially, substantially as described.

4. In a container provided with a closure, segments in the container, a flexible ring intermediate the container and the closure and having a diaphragm such as $c^4$ and also fitting said segments, the ring being such that when there is relative rotary motion between the ring and the container the ring is moved radially and circumferentially, substantially as described.

5. For use as a joint-maker, a flexible ring having segmental peripheral recesses adapted to fit segments provided on the closure of a container, said flexible ring being, further, adapted to move radially, so as to make the joint, when there is relative rotary movement between the closure and the container, substantially as described.

6. In a liquid, gas or like container, a closure, a plurality of superposed tiers of segments on said closure, a flexible ring arranged between the container and the closure and having segmental recesses shaped to fit the segments on the closure, the segments on the closure and the segmental recesses in the flexible ring being adapted when moved rotatably in relation to one another to produce a uniform lateral and circumferential expansion of the flexible ring.

In witness whereof we have hereunto set our hands in the presence of two witnesses.

WILLIAM ALFRED ROGERS.
EDGAR STANLEY.

Witnesses:
H. T. P. GEE,
RIPLEY WILSON.